United States Patent Office 3,322,783
Patented May 30, 1967

3,322,783
SUBSTITUTED 2-(5-NITRO-2-THIENYL)-
BENZIMIDAZOLES
George L. Dunn, Willingboro, N.J., assignor to Smith
Kline & French Laboratories, Philadelphia, Pa., a corporation of Pennsylvania
No Drawing. Filed July 14, 1964, Ser. No. 382,663
4 Claims. (Cl. 260—309.2)

This invention relates to novel substituted 2-(5-nitro-2-thienyl)-benzimidazoles having valuable therapeutic activity. More specifically, the novel compounds of this invention have utility as anthelmintic agents and are effective against such organisms as nematosporoides dupious, hymenolepis nana, aspiculurus tetraptera and syphacia oblevata. Most advantageously the novel compounds of this invention are effective against the pinworm syphacia oblevata.

The novel substituted 2-(5-nitro-2-thienyl)-benzimidazoles of this invention are represented by the following general formula:

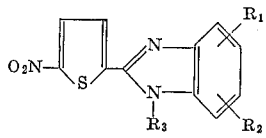

when:

$R_1$ represents hydrogen, lower alkyl, preferably of 1 to 6 carbon atoms, lower alkoxy of 1 to 6 carbon atoms, halogen, such as chloro, bromo or fluoro, alkoxycarbonyl or trifluoromethyl, $R_2$ represents hydrogen, lower alkyl, preferably of 1 to 6 carbon atoms, lower alkoxy of 1 to 6 carbon atoms, halogen, such as chloro, bromo or fluoro, and $R_3$ represents hydrogen, lower alkyl, preferably of 1 to 6 carbon atoms or hydroxy lower alkyl of 1 to 6 carbon atoms.

Advantageous compounds of this invention are represented by the above structural formula when $R_1$ and $R_2$ represent hydrogen and lower alkyl and $R_3$ represents hydrogen and β-hydroxy ethyl.

The compound of this invention which is particularly advantageous is 2-(5-nitro-2-thienyl)-benzimidazole.

The novel substituted 2-(5-nitro-2-thienyl)-benzimidazoles of this invention are prepared according to the following synthetic procedure in which $R_1$ and $R_2$ are given above.

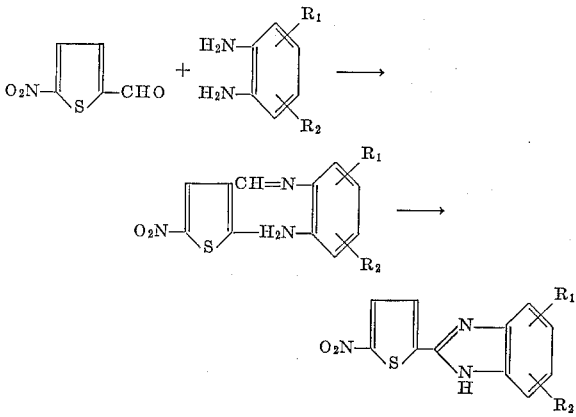

This method is carried out using readily available starting materials and gives excellent yields of the end product. Where certain compounds desired for use as starting materials are not available they can be prepared by methods described in the literature and well known to the art. By way of example, the preparation of 2-(5-nitro-2-thienyl)-benzimidazole is carred out by the following procedure.

The properly substituted o-phenylenediamine is suspended in an organic solvent, preferably alcohol, and to this suspension is added an alcoholic solution of 5-nitro-2-thiophenealdehyde. The resulting Schiff base is filtered and then suspended in glacial acetic acid and lead tetraacetate with stirring. The precipitate is collected, suspended in water and the pH of the suspension adjusted from about 6 to 9. The aqueous suspension is extracted with an organic solvent such as ethyl acetate and the combined extracts are dried. Chromatographic purification of this crude residue yields the desired 2-(5-nitro-2-thienyl)-benzimidazole in pure form.

This invention also includes nontoxic pharmaceutically acceptable addition salts of the above defined bases formed with organic and inorganic acids. Such salts are easily prepared by methods known to the art. The base is reacted with either the stoichiometric amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic mandelic, cinnamic, citraconic, aspartic, stearic, palmitic, itaconic, glycolic, p-aminobenzoic, glutamic, benzenesulfonic and theophylline acetic acids as well as with the 8-halotheophyllines for example 8-chlorotheophylline and 8-bromotheophylline. Exemplary of such inorganic salts are those with hydrochloric, hydrobromic, sulfuric, sulfamic, phosphoric and nitric acids. These salts may also be prepared by the classical method of double decomposition of appropriate salts which is well known to the art.

It will be readily apparent to one skilled in the art that variations of these procedures are possible. The preferable preparative procedures are the methods discussed above.

The novel 2-(5-nitro-2-thienyl)-benzimidazoles of this invention are preferably employed in combination with either a liquid or solid nontoxic pharmaceutical carrier. A wide variety of pharmaceutical forms useful for oral ingestion may be employed. Advantageously the preparation may take the form of tablets, capsules, powders, troches or lozenges. When a solid form is employed the pharmaceutical carrier may be, for example, lactose, magnesium stearate, starch, gums such as acacia, terra alba, stearic acid, sorbitol, mannitol, ethyl cellulose or gelatin. The amount of solid carrier will vary widely but preferably is from about 25 mg. to about 1 gm. If a liquid carrier is used the preparation can be in the form of a soft gelatin capsule, placed in an ampule or in a liquid suspension.

The novel compounds of this invention are administered internally, preferably orally, to animals in effective but nontoxic amounts to induce the desired anthelmintic effect.

The following examples are not limiting but are illustrative of compounds of this invention and the procedures for their preparation.

*Example 1*

To a cold (—10° C.) suspension of 3.5 g. of o-phenylenediamine in 35 ml. of alcohol is added an alcoholic solution of 5.0 g. of 5-nitro-2-thiophenealdehyde in 50 ml. with constant stirring. The resulting mixture is warmed to room temperature and filtered to give 7.0 g. of the Schiff base. 6.9 g. of the Schiff base is suspended in 60 ml. of glacial acetic acid and 13.2 g. of lead tetracetate and 150 ml. of warm glacial acetic acid is added. The mixture is stirred for about 15 minutes at a temperature of about 50 to about 60° C. The mixture is then cooled in about 25° C. and diluted with 900 ml. of water. The precipitate is then collected, suspended in water and the pH adjusted to about 7–8 with 3% aqueous sodium bicarbonate. The suspension is extracted with ethyl acetate and the combined extracts are dried. The residue is then boiled with benzene and evaporated. Chromatographic purification of this crude solid on neutral alumina using ethyl acetate-methylene chloride eluants yields pure 2-(5-nitro-2-thienyl)-benzimidazole having a melting point of 232–234° C. An ethereal solution of the free base is treated with ethereal hydrogen chloride to yield the hydrochloride salt.

*Example 2*

To a cold stirred suspension of 7.04 g. of 3,4-diaminobenzotrifluoride in 40 ml. of alcohol is added 6.28 g. of 5-nitro-2-thiophenecarboxaldehyde in 60 ml. of alcohol. The mixture is allowed to warm slowly to room temperature. The suspension is cooled to 10° C. and filtered to yield 8.06 g. of Schiff base. The Schiff base (6.3 g.) is suspended in 60 ml. of glacial acetic acid and treated with a warm solution of 8.8 g. of lead tetracetate in 100 ml. of glacial acetic acid. The mixture is then stirred for approximately 30 minutes at 60° C., poured into water and neutralized with sodium bicarbonate. The aqueous suspension is then extracted with ethyl acetate and the combined extracts dried. The residue is chromatographed on neutral alumina in methylene chloride-ethyl acetate to give 5-trifluoromethyl-2-(5-nitro-2-thienyl)-benzimidazole. An acetone solution of the free base is reacted with maleic acid to yield the maleate salt.

*Example 3*

A cold stirred suspension of 9.95 g. of 4,5-dichloro-o-phenylenediamine in 50 ml. of alcohol is treated with a solution of 7.85 g. of 5-nitro-2-thiophenealdehyde in 75 ml. of alcohol. Stirring is continued briefly at a temperature of about −10° C. and the mixture is then allowed to warm to room temperature and filtered to yield 12.6 of Schiff base. 9.5 g. of the Schiff base is suspended in 90 ml. of glacial acetic acid and treated with a warm solution of 13.3 g. of lead tetracetate in 150 ml. of glacial acetic acid. The mixture is stirred and then diluted with 1 l. of water. The solid is then filtered, suspended in water and neutralized to a pH of 7–8 and the aqueous suspension extracted with ethyl acetate. The residue left after removal of the solvent from the combined dry extracts is chromatographed on neutral alumina yielding pure 5,6-dichloro-2-(5-nitro-2-thienyl)-benzimidazole on the ethyl acetate-methylene chloride eluants. Reacting the free base with bismethylenesalicylic acid in ethyl acetate solution furnishes the bismethylenesalicylate salt.

*Example 4*

A stirred suspension of 6.8 g. of 4,5-dimethyl-o-phenylenediamine in 50 ml. of alcohol is cooled to −10° C. and treated with a solution of 7.85 g. of 5-nitro-2-thiophenecarboxaldehyde in 75 ml. of alcohol. Stirring is continued for approximately one hour, the mixture warmed to room temperature and filtered to give 12.4 g. of the Schiff base. A suspension of 8.25 g. of the Schiff base in 90 ml. of glacial acetic acid is treated with a warm solution of 13.3 g. of lead tetracetate in 150 ml. of glacial acetic acid. Stirring is continued at 50–60° C. for approximately 15 minutes, the mixture is poured in 1 l. of water, neutralized to a pH of 7–8 by the addition of sodium bicarbonate and finally extracted with ethyl acetate. The dry extracts are evaporated to give a dark residue which yields pure 5,6-dimethyl-2-(5-nitro-2-thienyl)-benzimidazole upon chromatographic purification through a neutral alumina column.

*Example 5*

A stirred cold suspension of 6.42 g. of 3,4-dimethoxy-o-phenylenediamino in 40 ml. of alcohol is treated with a solution of 6.28 g. of 5-nitro-2-thiophenecarboxaldehyde in 60 ml. of alcohol. The suspension is warmed to room temperature and filtered to yield 9.95 g. of the desired Schiff base. To a suspension of 9.92 g. of glacial acetic acid is added a warm solution of 13.3 g. of lead tetracetate in 150 ml. of glacial acetic acid. The suspension is stirred at 50–60° C. for approximately 15 minutes and the mixture poured into 1 l. of water. The mixture is then neutralized with sodium bicarbonate, extracted with ethyl acetate and evaporated. The residue obtained from the combined dry extracts is then chromatographed on neutral alumina to give 5,6-dimethoxy-2-(5-nitro-2-thienyl)-benzimidazole.

*Example 6*

A solution of 2.45 g. of 2-(5-nitro-2-thienyl)-benzimidazole (as prepared in Example 1) in 20 ml. of ethanol containing several drops of pyridine and 0.48 g. of ethylene oxide is heated at approximately 95° C. for about 14 hours. The resulting mixture is then concentrated in vacuo and the precipitated solid is collected and recrystallized from ethanol to yield 1-(2-hydroxyethyl)-2-(5-nitro-2-thienyl)-benzimidazole.

*Example 7*

A solution of 6.1 g. of N-methyl-o-phenylenediamine is mixed with a solution of 7.85 g. of 5-nitro-2-thiophenecarboxaldehyde in alcohol. The mixture is stirred and filtered to yield 10.9 g. of Schiff base. 7.83 g. of the Schiff base is suspended in 75 ml. of glacial acetic acid and treated with a warm solution of 13.3 g. of lead tetracetate and 150 ml. of glacial acetic acid. Stirring is continued for about 15 minutes at 60° C. and the solution is poured into 1 l. of water, neutralized with sodium bicarbonate and extracted with ethyl acetate. The combined extracts are dried and the residue is chromatographed on alumina to give pure 1-methyl-2-(5-nitro-2-thienyl)-benzimidazole in the methylene chloride-ethyl acetate eluants. An ethereal solution of the free base is treated with ethereal hydrogen bromide to yield the hydrobromide salt.

*Example 8*

To a cold suspension of 4.5 g. of 4-ethoxycarbonyl-o-phenylenediamine in 40 ml. of alcohol is added an alcoholic solution of 7.0 g. of 5-nitro-2-thiophenealdehyde with constant stirring. The mixture is warmed to room temperature and filtered to yield 8.0 g. of the Schiff base. A suspension of 7.0 g. of the Schiff base in 100 ml. of glacial acetic acid is treated with a warm solution of 15.0 g. of lead tetracetate in 150 ml. of glacial acetic acid. The suspension is stirred for approximately 15 minutes and the mixture poured into 1 l. of water. The mixture is then neutralized, extracted with ethyl acetate and evaporated. The residue obtained from the combined dry extracts is then chromatographed on neutral alumina to give pure 5-ethoxycarbonyl-2-(5-nitro-2-thienyl)-benzimidazole.

What is claimed is:
1. A chemical compound of the class consisting of a free base and its nontoxic pharmaceutically acceptable acid addition salts, the free base having the formula:

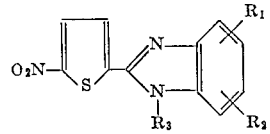

in which:
R$_1$ is a member selected from the group consisting of hydrogen, lower alkyl, lower alkoxy, halogen, alkoxycarbonyl and trifluoromethyl,
R$_2$ is a member selected from the group consisting of hydrogen, lower alkyl, lower alkoxy and halogen, and $R_3$ is a member selected from the group consisting of hydrogen, lower alkyl and hydroxy lower alkyl.

2. A chemical compound of the formula:

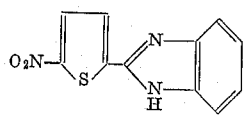

3. 2-(5-nitro-2-thienyl)-benzimidazole hydrochloride.

4. A chemical compound of the formula:

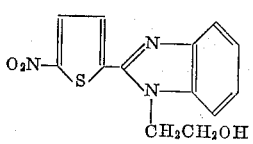

References Cited

UNITED STATES PATENTS 3,155,571  11/1964  Sarett et al. _____ 260—309.2

OTHER REFERENCES

De Selms, J. Org. Chem., vol. 27, pages 2163 to 2165 (1962).

1,117,000, November 1961, German Auslegeschrift, 2 pp. spec.

1,138,058, October 1962, German Auslegeschrift, 2 pp. spec.

JOHN D. RANDOLPH, *Primary Examiner.*